Aug. 25, 1959 R. E. H. CARPENTER 2,901,298
PIVOTAL SUPPORTS
Filed Aug. 23, 1957 2 Sheets-Sheet 1
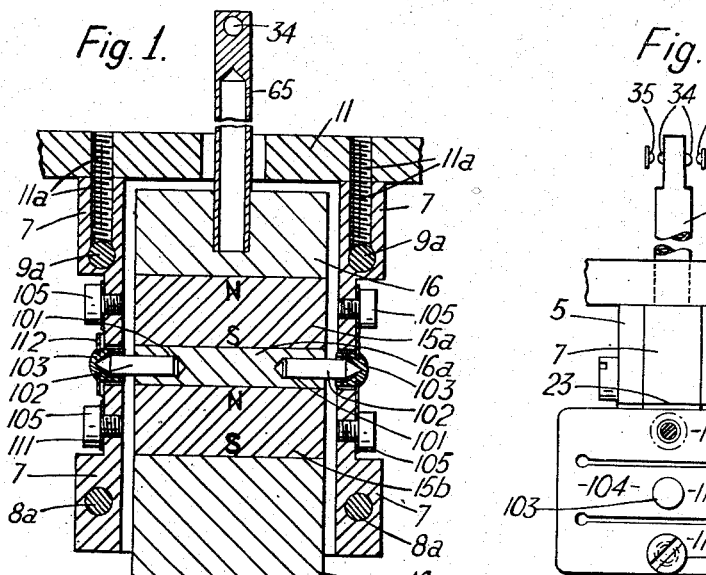
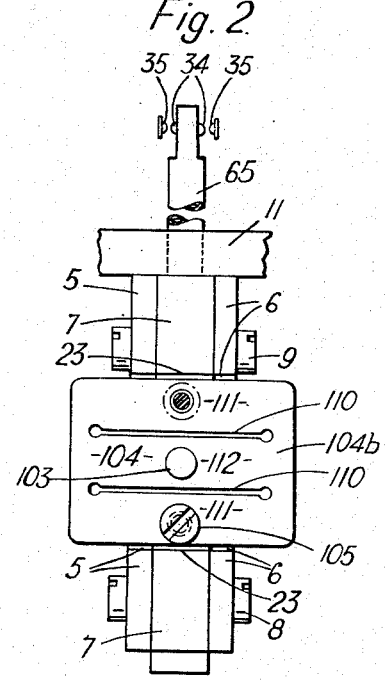
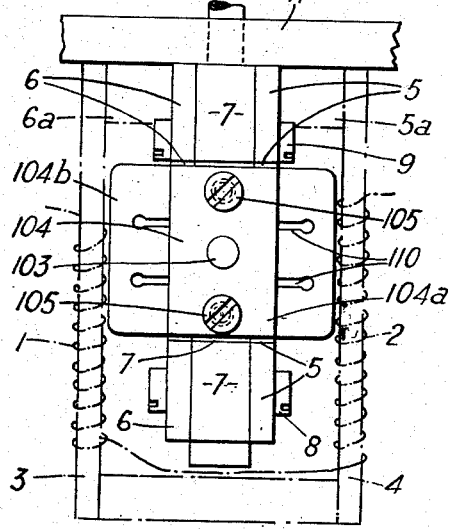
Rupert Evan Howard Carpenter
Inventor
Ralph B. Stewart
By
Attorney Aug. 25, 1959   R. E. H. CARPENTER   2,901,298
PIVOTAL SUPPORTS
Filed Aug. 23, 1957   2 Sheets-Sheet 2
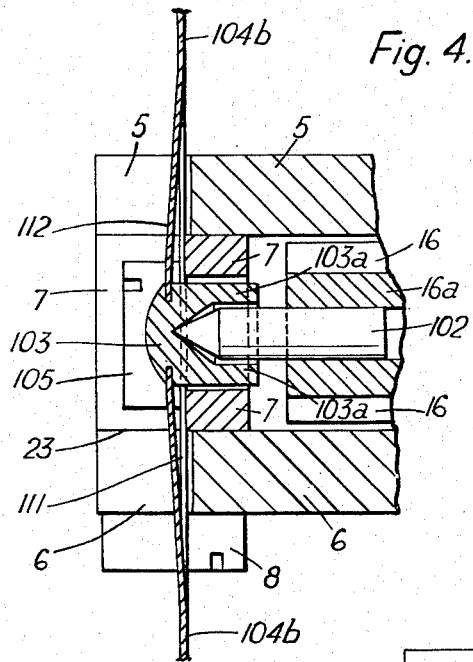
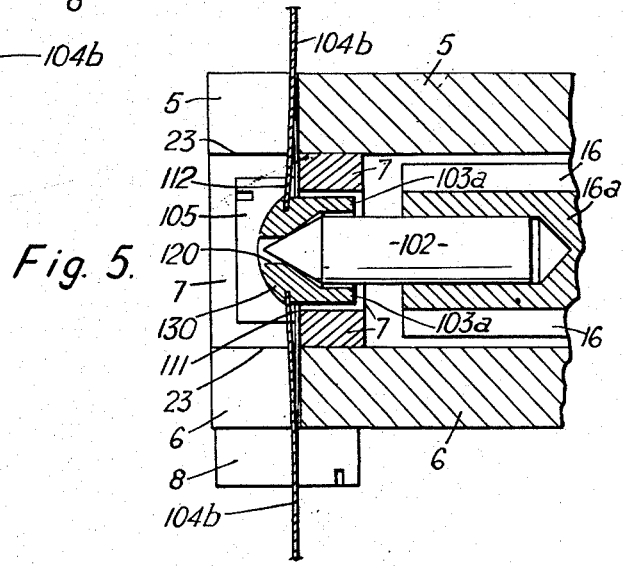
Inventor
Rupert Evan Howard Carpenter
By Ralph B. Stewart
Attorney

United States Patent Office 2,901,298
Patented Aug. 25, 1959

2,901,298

PIVOTAL SUPPORTS

Rupert Evan Howard Carpenter, South Croydon, England

Application August 23, 1957, Serial No. 679,971

Claims priority, application Great Britain
August 31, 1956

12 Claims. (Cl. 308—159)

This invention relates to arrangements for supporting pivotally on a frame a moving part, such as the armature of a polarised electromagnetic relay, the moving system of an indicating instrument (such as the moving coil of a d'Arsonval type meter), or the balance or other wheel of a clock or watch.

According to this invention, such an arrangement includes two coaxial bearings which are secured to the frame and which support the armature (or other moving part) on opposite sides through tapered surfaces which restrain the armature from movement transverse to the axis of the bearings, and at least one of the bearings is mounted on a plate, the resilience of which makes the bearing compliant in an axial direction and causes it to be continuously pressed in this direction to maintain the support of the armature through the tapered surfaces. With an arrangement according to this invention, the axis about which the armature turns is accurately positioned by the tapered surfaces, and this positioning is permanent for if wear takes place at the tapered surfaces, the resilience of the plate ensures that this wear is taken up and that the support of the armature is maintained.

The bearings may be secured to the frame, for example by screws passing through oversize holes or slots, so as to be adjustable in directions transverse to the axis of the bearings. With such adjustable bearings, the axis about which the armature turns may be moved in these directions. This is a particularly desirable feature in polarised electromagnetic relays in which it is of importance to ensure that the armature is accurately set initially with respect to the pole faces of the signals magnetic structure. In assembling such a relay, the armature is first rigidly held in the desired position with relation to these pole faces, as by using shims, then the bearings are brought up and pressed axially by hand to support the armature through the tapered surfaces which serve to position the bearings correctly, and finally these bearings are secured to the frame (at least one of them by means of the plate) so that the axis of turning is accurately and permanently set. The shims are then removed.

In one form of pivotal support according to the invention, only one of the bearings is mounted so as to have axial compliance, the second being secured to the frame so that this bearing is restrained from axial movement. With this form of support, the armautre is not free to float axially, and therefore the moving contacts are not able to be moved in a direction normal to their operating movement, for example when the relay is accelerated. Any such normal movement would lead to a change in contact gap, if the contacts were pitted. In one such form of support, the second bearing is mounted on a plate which has negligible axial compliance, and which therefore resists any axial movement of the bearing it carries.

For the sake of simplicity, each bearing may have a tapered surface which cooperates directly with a tapered surface turning with the armature. If desired, however, ball or roller bearings, either with or without cages, may be interposed between such surfaces and, indeed, one of these surfaces need not then be tapered at all. When directly cooperating tapered surfaces are employed, those turning with the armature may be formed on the tapered ends of two coaxial pins extending from opposite sides of the armature, these tapered ends fitting into tapered sockets in the bearings. Alternatively the tapered surfaces turning with the armature may be formed by tapered depressions or cavities in the sides of the armature, and the bearings may be in the form of pins or spigots having their inner ends tapered to fit into these cavities or depressions to support the armature.

The tapered surfaces may be conical, frusto conical, or part hemispherical; when conical, it is preferred that they cooperate with one another substantially at their pointed ends (rather than a substantial distance from them) since this minimises the frictional torque exerted by the bearings on the armature as it turns.

The resilience of the plate carrying the first bearing is produced by suitably shaping it and securing it to the frame. Thus the plate may be provided with two parallel slits which divide the plate into three parallel limbs, of which the two outer ones are secured at or near their mid-points to the frame and of which the central one carries the bearing at or near its mid-point. In another construction, the plate is not provided with slits, but is secured to the frame at only one end in the manner of a cantilevered leaf spring. In yet another construction, the plate is in the form of a circular diaphragm having either circumferential ripples which flex to provide the axial compliance, or spiral slits which produce arms which spiral out from the centre of the diaphragm where the member is carried and which give to provide the axial compliance.

In order that the invention may be easily understood and readily carried into effect, a polarised electromagnetic relay having a pivotal support for its armature constructed according to this invention will now be described, by way of example, with reference to the accompanying drawings, in which:

Figure 1 is a vertical cross-section of parts of the relay including the armature and its support;

Figure 2 is an elevation of these parts of the relay as seen from the left of Figure 1;

Figure 3 is a similar elevation as seen from the right of Figure 1 and also showing in dotted lines the signal windings of the relay and the magnetic cores associated with them;

Figure 4 is an enlarged horizontal cross-section of the said parts of the relay; and Figure 5 corresponds to Figure 4 but shows a modified support.

The relay is constructed in accordance with my U.S. Patent No. 2,816,976 and similar reference numerals are therefore employed in these figures as in Figures 7 and 8 of the issued patent. Thus, the relay includes two signal windings 1 and 2 arranged side by side and linked with a U-shaped core 3, 4 the upper ends of which are connected magnetically (by soft-iron blocks indicated at 5a and 6a) to the upper ends of respective soft-iron parallel plates 5 and 6. These plates 5 and 6 are maintained a fixed distance apart by two upright non-magnetic bars 7 constituting part of the relay frame. The plates 5 and 6 are secured to these bars 7 by bolts 8 and 9, having shanks shown at 8a and 9a in Figure 1. The plates 5 and 6 and the bars 7 support an insulating block 11 which is secured in place by screws passing through bores 11a (Figure 1). The static contacts, indicated at 35, of the relay are mounted on the block 11 in the same way as disclosed in the said complete specification and are arranged on opposite sides of the moving contacts 34 which are secured on opposite faces of a post 65 secured to the armature.

This armature is similar to the one described in the said complete specification, including as it does two soft-iron end pieces 16 and polarising means arranged between them, but here this polarising means includes two permanent magnets 15a and 15b which are separated by a central soft-iron piece 16a. This central piece 16a is provided to enable the armature to be readily formed with two bores 101 having a common axis passing through the centre of gravity of the armature. A pair of similar pins 102 are press-fitted into these bores 101 to extend from opposite sides of the armature and they have outer conically tapered ends which cooperate directly at their pointed ends with the pointed ends of the corresponding, conically tapered, inwardly directed surfaces of two coaxial bearings 103 of somewhat larger angle. It will be appreciated that in practice the conical surfaces cooperate with one another not just at their points but for some little distance from these points. Each bearing 103 is provided with a cylindrical extension 103a which surrounds the outer portion of the cylindrical part of the corresponding pin 102 so as to prevent this pin either jumping out of the bearing or gouging its conical surface when the relay is subjected to rough treatment. Each of the bearings 103 is carried at the centre of a plate 104 and is conveniently made of silver or a silver-indium alloy (although jewels may be used). Each of the two plates 104 and thus the bearings 103 is secured by screws 105 to the corresponding bar 7 and lies in a cut-away portion 23 which extends horizontally right across the plates 5 and 6 and the bar 7. Each of the screws 105 passes through an oversize hole in the corresponding plate 104, so that this plate 104 may be adjusted transversely to the axis of the pins 102, before being secured in place. Once thus secured, the conical surfaces of the bearings 103, which support the armature on opposite sides, restrain this armature from transverse movements.

The plate 104 at the right-hand end of the armature (as seen in Figure 1) is a simple rectangular plate referred to as 104a in Figure 3 and is therefore comparatively unyielding in an axial direction so that the right-hand bearing 103 is restrained from axial as well as transverse movement.

The other plate, indicated at 104b is, however, elongated in a horizontal direction and provided with two parallel slits 110 which divide the plate into two side limbs 111, formed at their mid-points with the oversize holes for the fixing screws 105, and a central limb 112 which carries the bearing member 103 at its mid-point. The central limb 112 is relatively stiff in a transverse direction but because of the elongated shape of this plate 104b and the provision of the slits 110, it is resilient in an axial direction so that the left-hand bearing 103 is compliant, and is continuously pressed, in this direction. Thus as wear takes place between the ends of the pins and the bearings 103, the conical surfaces of both bearings 103 maintain the support of the armature, the axis of which is maintained in its original position.

When the relay is being assembled, the armature is first held in a central symmetrical position between the two plates 5 and 6, as by using shims, and then the two bearings 103, mounted on their plates 104, are brought up to the ends of the pins 102 and pressed against them axially, thus ensuring that these bearings 103 are in the correct positions; the screws 105 are then tightened and the shims removed. The armature then remains in its initial position and, as previously indicated, remains there even though wear takes place between the pins 102 and the bearings 103.

With the pivotal support shown, the limb 112 of the plate 104b is bowed outwardly as the plate is being secured in place by the screws 105, but with a modified support (not shown), the limb 112 is initially bowed inwardly but is pushed outwardly until it is coplanar with the limbs 111 by the pin 102 of the armature when the screws 105 are being tightened. When this plate 104b is thus made flat the bearing 103 which it carries is even less likely to move in a transverse direction.

In the modified support shown in Figure 5, each of the bearings 103 is perforated as at 120 and the point of the pin 102 protrudes into this perforation.

I claim:

1. A pivotal supporting system comprising an angularly movable part such as the armature of a polarized relay and having a pair of supporting surfaces, one on each side thereof, two coaxial spaced bearings having a pair of opposed surfaces cooperating with the surfaces of the part to restrain movements thereof transverse to the axes of the bearings, the surfaces of at least one pair being tapered, two supports at opposite sides of said part, each of said bearings being fixed rigidly to a corresponding one of said supports, a frame on which said supports are mounted, and clamping means rigidly clamping said supports against said frame through engaging surfaces on said supports and said frame, said supports being movable, on removal of said clamping means, over said surfaces of said frame so as to permit said bearings to be shifted in directions transverse to the axis of said bearings, at least one of said supports comprising a resilient plate clamped in position by said clamping means so that the resilience of said plate causes the bearing fixed to said plate to be continuously pressed in an axial direction to maintain accurately the position of the axis of said part through said tapered surfaces.

2. A system according to claim 1, said clamping means comprising screws passing through oversize openings in said supports.

3. A system according to claim 1, the other of said supports being rigid such that the bearing carried by the support is restrained from axial movement.

4. A system according to claim 3, the said other support comprising a rigid plate.

5. A system in accordance with claim 1 in which the surfaces of each pair are tapered.

6. A system according to claim 1 in which said part has a cylindrical pin projecting from each side thereof and coaxially arranged, the ends of said pins comprising the tapered supporting surfaces of one pair, and said bearings being in the form of sockets comprising the tapered supporting surfaces of the other pair and cooperating directly with the surfaces of the first pair.

7. A system according to claim 6 in which each of said sockets has a cylindrical extension surrounding the outer portion of the cylindrical part of the corresponding pin.

8. A system according to claim 5, in which the said other support comprises a plate, and the cooperation between each bearing and the corresponding surface turning with the said part taking place substantially in the plane of the corresponding plate.

9. A system according to claim 1, in which said plate comprises three parallel limbs separated by two parallel slits, the outer two of said limbs being clamped rigidly to said frame substantially at their mid-points and the central one of said limbs carrying the bearing substantially at the mid-point of the limb.

10. A system according to claim 1, in which said tapered surfaces have frusto-conical portions.

11. A system according to claim 5, in which said tapered surfaces are conical and cooperate with one another substantially at their pointed ends.

12. A method of pivotally mounting an armature in a polarized electromagnetic relay, comprising the steps of firmly holding said armature in the desired position with respect to the pole faces of the signals magnetic structure as by using shims, bringing up to said armature from opposite sides a pair of bearings, each rigidly fixed to a plate with the axis of said bearing perpendicular to said plate, at least one of said plates being resilient in the direction of the axis of its bearing, pressing said bearings axially to cooperate with said armature through tapered surfaces which act to bring the bearings into the correct positions, and rigidly clamping said plates against said frame through engaging surfaces on said plates and on said frame, so that the resilience of the resilient plate causes the bearing fixed to this plate to be continuously pressed in an axial direction to maintain accurately the position of the axis of the armature through the tapered surfaces.

References Cited in the file of this patent

UNITED STATES PATENTS

| | | |
|---|---|---|
| 1,447,587 | Calvert | Mar. 6, 1923 |
| 2,094,960 | Putnam | Oct. 5, 1937 |